Aug. 20, 1968   P. WEBER   3,398,359
HYSTERESIS DIAGRAM DISPLAY DEVICE
Filed Sept. 27, 1965
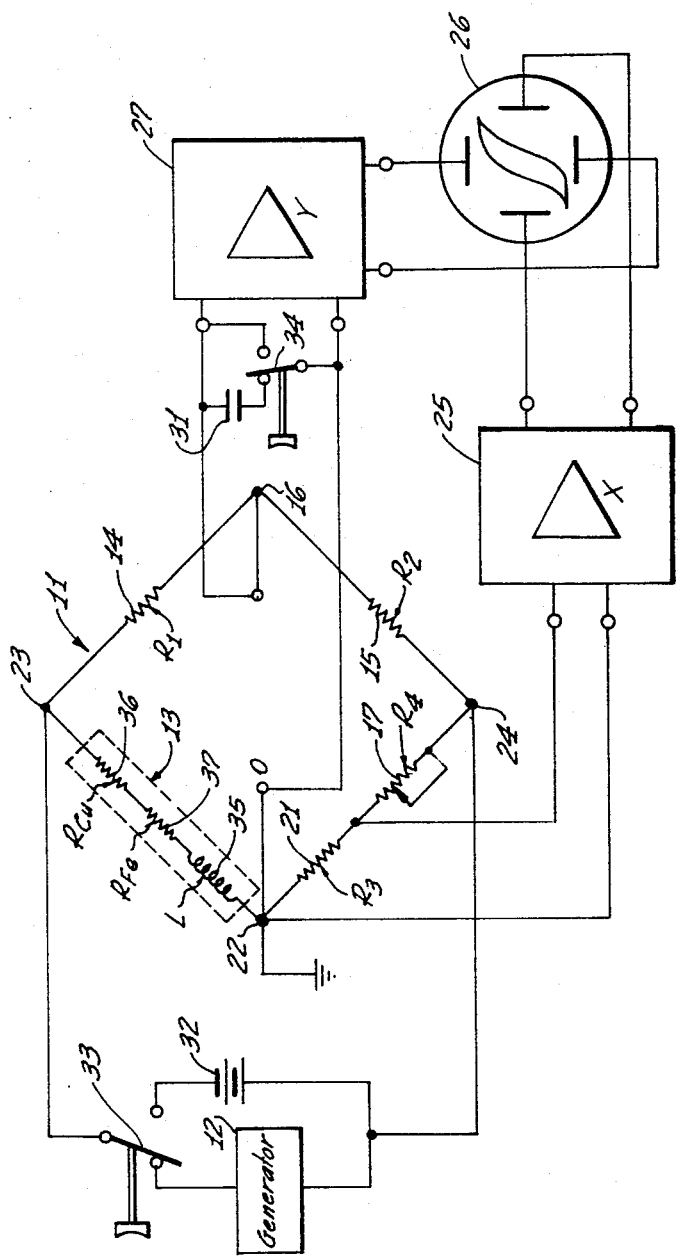
INVENTOR:
Paul Weber
By Jerome B. Rockwood
Agent

United States Patent Office 3,398,359
Patented Aug. 20, 1968

3,398,359
HYSTERESIS DIAGRAM DISPLAY DEVICE
Paul Weber, Freiburg im Breisgau, Germany, assignor to Fritz Hellige & Co. G.m.b.H., Freiburg im Breisgau, Germany
Filed Sept. 27, 1965, Ser. No. 490,177
Claims priority, application Germany, Oct. 7, 1964, H 53,969
6 Claims. (Cl. 324—34)

ABSTRACT OF THE DISCLOSURE

A device for displaying the hysteresis diagram of a finished ferromagnetic core device having at least one winding thereon. The winding is connected as one arm of a resistor bridge circuit. The bridge is balanced with a DC source to compensate for resistance of the winding. An AC source connected across the bridge energizes the core. A portion of the AC voltage is applied to the X axis of an oscilloscope. The Y axis signal is obtained across the opposite arms of the bridge from the source. An RC integrator in the Y axis circuit is formed by a bridge resistor and a short capacitor connected across the Y axis deflection terminals.

---

This invention relates to magnetic core testing and, more particularly, to means for displaying the hysteresis diagram of a ferromagnetic core after assembly into an inductance or transformer. It is well known to those skilled in the art that the shape of the hysterisis diagram of a ferromagnetic material supplies important information about the magnetic properties thereof, particularly after assembling into magnetic cores with a number of windings. Therefore, techniques for displaying hysteresis loops are important, particularly for the purpose of determining the magnetic properties of cores at operating frequencies. To display such hysteresis loops, the magnetic flux B and the magnetomotive force H, the inherent properties of the material, must be determined; the value of B being monitored as a function B(H) of the value of H within a system of mutually orthogonal coordinates.

Generally, an oscillographic representation on a cathode ray tube, displaying the B–H curve is highly desirable. Such a cathode ray tube display is quickly available and readily interpreted. In the present invention a voltage is associated with the abscissa of the display area which is applied to the cathode ray oscilloscope X-axis electrodes proportional to the energizing current in the winding. The voltage applied to the horizontal electrodes is proportional to the magnetomotive force H. A voltage which is a function of changes in magnetic flux B is derived from a winding mounted on the core material to be tested. Upon integration, a signal is obtained which is proportional to flux B. This signal is applied to the vertical axis deflecting electrodes of the oscilloscope.

Heretofore in the prior art, in order to determine the magnetic properties of ferromagnetic cores having windings thereon, such as chokes and transformers, it has been necessary to mount a special probe winding upon the unit to be tested. This is time consuming and frequently quite difficult, as in the case of compact transistor circuit transformers. Further, the core may be completely covered by the windings or may be potted. With respect to potted inductances with iron cores, knowledge of the shape of the hysteresis loop is particularly important since the potting may significantly modify the magnetic properties due to mechanical stresses exerted on the core by the potting material as it cures. In the present invention, a probe winding is not required. One of the windings normally present upon the unit to be tested may be employed for energizing the iron of the core.

It is, therefore, an object of this invention to provide a hysteresis loop display device wherein a ferromagnetic core may be excited by an existing winding.

Another object of this invention is to provide a device for displaying a hysteresis loop on an oscilloscope screen.

Another object of this invention is to provide a hysteresis loop display device wherein is generated an X-axis deflection voltage proportional to magnetomotive force and a Y-axis deflection voltage proportional to flux.

Another object of this invention is to provide a circuit deriving a signal voltage proportional to flux B from the voltage across a winding normally present on the core material.

Another object of this invention is to provide means for balancing out the DC resistance of the core winding employed for deriving the flux signal.

Another object of this invention is to provide an hysteresis loop display device which is accurate, simple and rapid to use and is simple and inexpensive to manufacture.

These and other objects and advantages of the present invention will become apparent from the following specification and accompanying drawing, wherein the sole figure is a schematic diagram illustrating the hysteresis loop display device of the present invention.

The hysteresis loop display device of the present invention includes a bridge circuit 11 energized by an alternating current generator 12. Generator 12 provides a voltage to the test unit 13 at the frequency at which test unit 13 will normally operate. Bridge 11 includes resistors 14 and 15 connected at point 16. The test unit 13 and resistor 21 are connected at point 22. Resistor 17 is made variable for reasons to be disclosed hereinbelow. Alternating current generator 12 is connected to the bridge at points 23 and 24. Point 22 will normally be grounded.

The input terminals of X-axis amplifier 25 are connected across resistor 21. Output terminals thereof are connected to horizontal deflecting points of cathode ray oscilloscope 26. The input terminals of Y-axis amplifier 27 are connected to bridge points 16 and 22, and integrating capacitor 31 is normally connected across the input terminals of Y-axis amplifier 27. The output terminals of Y-axis amplifier 27 are connected to the vertical deflection points of cathode ray oscilloscope 26. A direct voltage source, such as battery 32, may be placed in circuit instead of alternating current generator 12 by means of single-pole double-throw switch 33. Battery 32 is employed to enable adjustment of variable resistor 17 to compensate for the resistance of the winding employed. Another single-pole double-throw switch 34 is provided to short out the input terminals of Y-axis amplifier 27. The Y-axis deflecting voltage in cathode ray oscilloscope 26 is derived from the diagonal branch between points 16 and 22 of the bridge, conjugate to branch 23–24 to which is supplied alternating voltage from generator 12. The voltage from branch 16–22 is applied to integrating capacitor 31. Capacitor 31 is charged by a current which is a function of the complex voltage across the energizing winding of the unit 13 to be tested. The energizing winding is designated 35 in the drawing.

As discussed hereinabove, the energizing winding 35 may be any winding that is present on the core. Consequently, the voltage appearing across capacitor 31 is proportion to the integral of the voltage appearing across measuring branch 22–23 of the bridge. This is valid only under the condition that the product of the measuring frequency $\omega$, the capacity C of capacitor 31 and the resistance value of the internal bridge resistances comprising substantially the resistances of the resistors 14 and 15 greatly exceeds 1. Thus $\omega R_{14}C \gg 1$ and $\omega R_{15}C \gg 1$. Under this condition the fundamental frequency is integrated with a very small error, decreasing for harmonic of the fundamental. The energizing winding 35 on the iron core to be tested is connected in the bridge branch between points 22 and 23. Integrating resistor 15 is provided in the conjugate bridge branch between points 16 and 24. The bridge branch between points 22 and 24, in series with the bridge input circuit which includes the energizing winding 35, includes two auxiliary resistors 17 and 21. The voltage drop across resistor 21, adjacent to the energizing winding 35, is proportional to the energizing current. This voltage is applied to the X deflection electrodes of cathode ray oscilloscope 26 through amplifier 25. Integrating resistor 14 is connected in the bridge branch between points 16 and 23.

The DC resistance of the winding 35 is indicated in the drawing by resistor 36 and is additionally labelled $R_{Cu}$.

The values of resistors 14, 15, 17, 21 and 36 are dimensioned so that the following condition is fulfilled.

$$R_{Cu}R_{15} = R_{14}(R_{17}+R_{21})$$

It can be seen that if the resistance values satisfy, and if the bridge input is supplied from the DC current source 32, the bridge is balanced so that no DC voltage appears between grounded bridge terminal 22 and terminal 16. With the DC input the inductive impedance of winding 35 and the iron resistance $R_{fe}37$, representing the iron losses, do not appear. Thus the ohmic resistance of the energizing winding $R_{Cu}36$ is compensated. When the energizing input voltage is transferred from DC source 32 to AC source 12 by switch 33, no error is introduced into the hysteresis loop display due to ohmic resistance of the coil. Only those magnetic properties which are characteristic of the behavior of the inductance under alternating current excitation at the desired frequency furnished by generator 12 appear in the hysteresis loop. Resistor 17 is made adjustable to compensate for varying copper resistances and to enable DC balance of the bridge.

The alternating voltage appearing between points 16 and 22 of the bridge produces a proportional charging current for integrating capacitor 31. The voltage across integrating capacitor 31 is, therefore, proportional to the integrated charging current and, therefore, propotional to the voltage drop representative of the magnetic properties of the iron core and its energizing winding that is, L, 35 and $R_{Fe}$, 37. The inductive impedance and the iron resistance, 35 and 37 respectively, in the energizing winding may be neglected as compared to the complex term $$R_{14} - j\frac{1}{\omega C}$$

It will be apaprent from this equation that $R_{14}$ must be large and the capacity of integrating capacitor 31 must be as small as is consistent with the other requirements. It will be apparent, therefore, that the flux B display along Y-axis of the oscilloscope 26 is based on the concept that the copper resistance is compensated for, since the voltage drop across the energizing winding resistance set up by the energizing current is zeroed out in the bridge circuit, leaving only the voltage proportional to B present at the input terminals of Y-axis amplifier 27.

In the preferred embodiment of this invention the bridge resistors are selected so that resistor 14 equals resistor 15 and the sum of resistors 17 and 21 equal the copper resistance 36 of the energizing winding. Resistor 17 is made adjustable to enable balancing out of the DC resistances 36 in the unit 13 to be tested. The voltage proportional to magnetomotive force H is obtained simply by applying the voltage drop across resistor 21 to the input terminals of X-axis amplifier 25 and therefrom to the horizontal deflection electrodes of cathode ray oscilloscope 26. It will be apparent from the circuit that the voltage drop across resistor 21 is directly proportional to the energizing current supplied by alternating current generator 12 to bridge terminals 23 and 24. Resistor 21 is in series with the unit 13 to be tested.

One of the advantages resulting from employment of an existing winding on the unit to be tested rather than a probe winding is that the existing winding normally would make available a large number of turns providing a relatively high voltage for operation by the integrating circuit. Having a reasonably high voltage available enables accurate integration by a simple RC integrator rather that necessitating employment of an operational amplifier.

Compensating for the copper resistance 36 by balancing the bridge energized by DC source 32 by adjusting resistor 17 results in a zero direct voltage between points 16 and 22. If Y-axis amplifier 27 is a DC amplifier, balancing the bridge will place the spot on the oscilloscope screen at the zero center position. The zero center 11 may be checked by operating switch 34, shorting the input terminals of amplifier 27. If the spot does not move vertically, the bridge is properly balanced. If Y-axis amplifier is an AC amplifier, the bridge may be zeroed at DC by connecting an auxiliary zero-center galvanometer between points 16 and 22 on the bridge. In either case, this amplifier must have stable gain and phase shift characteristics for an accurate display, as will be readily apparent to those skilled in the art.

What is claimed is:

1. A device for displaying the hysteresis loop of a ferromagnetic core inductance comprising a bridge circuit including means connecting said inductance in a first arm of said bridge and means for compensating for the winding resistance of said inductance in a second arm of said bridge, means energizing said bridge circuit, integrating means connected across said bridge, a cathode ray oscilloscope, means connecting said integrating means to the vertical deflection plates of said cathode ray oscilloscope, and means connecting the horizontal deflection plates of said cathode ray oscilloscope to an arm of said bridge adjacent said inductance.

2. A device for displaying the hysteresis loop of a freromagnetic core inductance comprising a bridge circuit including means connecting said inductance in a first arm of said bridge and means for compensating for the winding resistance of said inductance in a second arm of said bridge, an AC generator energizing said bridge circuit, integrating means connected across said bridge, a cathode ray oscilloscope, means connecting said integrating means to the vertical deflection plates of said cathode ray oscilloscope, and means connecting the horizontal deflection plates of said cathode ray oscilloscope to an arm of said bridge adjacent said inductance.

3. A device for displaying the hysteresis loop of a ferromagnetic core inductance comprising a bridge circuit including means connecting said inductance in a first arm of said bridge and means for compensating for the winding resistance of said inductance in a second arm of said bridge, an AC generator energizing said bridge circuit including said inductance, integrating means connected across said bridge, a cathode ray oscilloscope, a vertical amplifier connected to said integrating means, means connecting said vertical amplifier to the vertical deflection plates of said cathode ray oscilloscope, and means connecting the horizontal deflection plates of said cathode ray oscilloscope to an arm of said bridge adjacent said inductance.

4. A device for displaying the hysteresis loop of a ferromagnetic core inductance comprising a bridge circuit including means connecting said inductance in a first arm of said bridge and means for compensating for the winding resistance of said inductance in a second arm of said bridge, an AC generator energizing said bridge circuit including said inductance, integrating means connected across said bridge, a cathode ray oscilloscope, a vertical amplifier connected to said integrating means, means connecting said vertical amplifier to the vertical deflection plates of said cathode ray oscilloscope, a horizontal amplifier connected to an arm of said bridge adjacent said inductance, and means connecting said horizontal amplifier to the horizontal deflection plates of said cathode ray oscilloscope.

5. A device for displaying the hysteresis loop of a ferromagnetic core inductance comprising a bridge circuit including means connecting said inductance in a first arm of said bridge, an AC generator energizing said bridge circuit including said inductance, integrating means connected across said bridge, a cathode ray oscilloscope, a vertical amplifier connected to said integrating means, means connecting said vertical amplifier to the vertical deflection plates of said cathode ray oscilloscope, a horizontal amplifier connected to a second arm of said bridge adjacent said inductance, means connecting said horizontal amplifier to the horizontal deflection plates of said cathode ray oscilloscope, and means for compensating for the winding resistance of said inductance including a variable resistor in said second arm of said bridge and a switch for connecting a DC voltage sources to said bridge in place of said AC generator for DC balancing of said bridge.

6. A device for displaying the hysteresis loop of a ferromagnetic core inductance comprising a bridge circuit including means connecting said inductance in a first arm of said bridge, an AC generator energizing said bridge circuit including said inductance, an integrating circuit including resistors in a second and a third arm of said bridge and a capacitor connected between the junction of said second and third arms and the junction of said first and a fourth arm, a cathode ray oscilloscope, a vertical amplifier connected across said integrating circuit, means connecting said vertical amplifier to the vertical deflection plates of said cathode ray oscilloscope, a horizontal amplifier connected to a fourth arm of said bridge adjacent said inductance, means connecting said horizontal amplifier to the horizontal deflection plates of said cathode ray oscilloscope, and means for compensating for the winding resistance of said inductance including a variable resistor in said fourth arm of said bridge and a switch for connecting a DC voltage source to said bridge in place of said AC generator for DC balancing of said bridge.

References Cited

UNITED STATES PATENTS 2,841,763    7/1958    Stuart-Williams _____ 324—40

OTHER REFERENCES

"Review of Modern Physics," American Physical Society, by R. M. Bozorth, January 1947, p. 82.

RUDOLPH V. ROLINEC, *Primary Examiner.*

P. A. URIBE, *Assistant Examiner.*